Oct. 8, 1929.    J. W. PETERSON ET AL    1,730,944
MEANS FOR IMPROVING THE ADHESION OF VEHICLE WHEELS TO RAILS
Filed June 2, 1928
*Fig. 1*
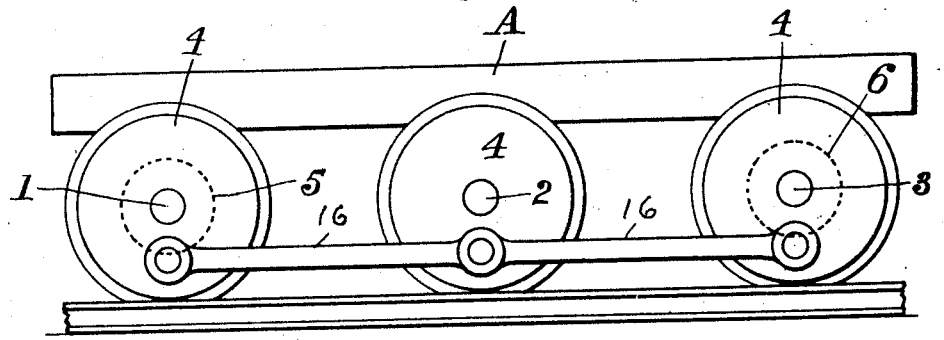
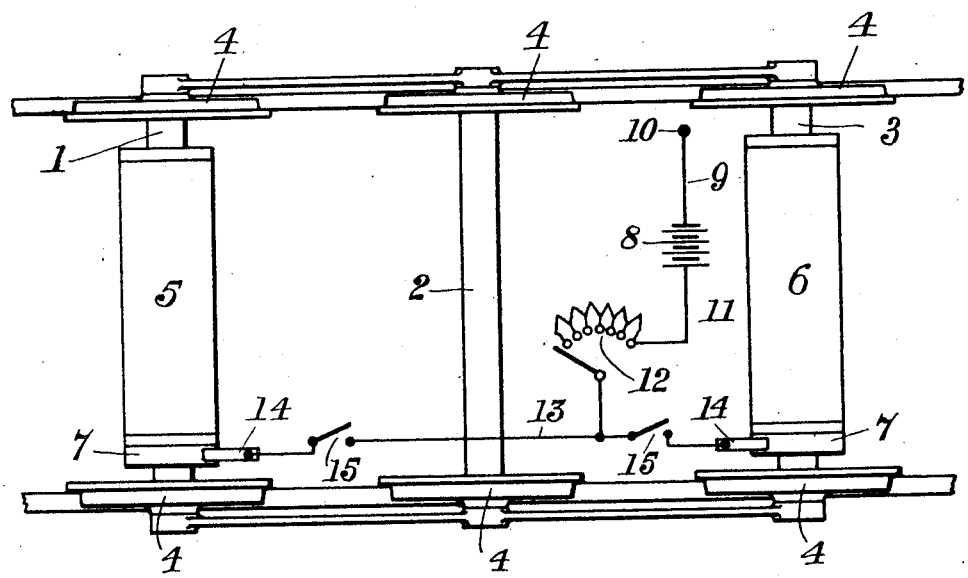
*Fig. 2*
INVENTORS
J. W. PETERSON
T. C. JUNER Patented Oct. 8, 1929

1,730,944

UNITED STATES PATENT OFFICE

JAMES WILLIAM PETERSON AND THOMAS CAMPBELL JUNER, OF EDINBURGH, SCOTLAND

MEANS FOR IMPROVING THE ADHESION OF VEHICLE WHEELS TO RAILS

Application filed June 2, 1928, Serial No. 282,363, and in Great Britain June 7, 1927.

This invention relates to an improved means for increasing the adhesion of vehicle wheels to their track rails of the kind wherein electromagnet coils or solenoids are arranged around the driving-wheel axles and when energized magnetize the axles and wheels.

According to the present invention each pair of driving wheels with its axle and magnetizing coil, which is plain, constitutes an individual unit which we arranged under the control of an independent switch, so that one or a number of the coils can be selectively energized by operation of the appropriate switch or switches, to increase the grip of a corresponding number of pairs of wheels on the rails.

We prefer to arrange a common resistance in series with all of the switches so that the degree of excitation can be varied as desired.

In the accompanying drawings:—

Fig. 1 illustrates, in side elevation, the frame indicated at A and the wheels of a locomotive or like railway vehicle, and Fig. 2 is a plan view thereof, the frame being omitted and the wiring for the electromagnets shown.

In this example the axles are indicated by references 1, 2 and 3 and their wheels by 4. Around the axles 1 and 3 coils 5 and 6 are arranged and each is electrically connected at one end to slip rings 7 and at its other end to the frame A. A battery 8 is shown as the source of electricity and feeds the coils 5 and 6 by way of line 9 connected to the frame 10, and line 11 connected to a variable resistance 12 joined to a line 13 having brushes 14 at each end and switches 15.

When it is desired to bring the means above shown into use, one or both of the switches 15 is closed and the resistance introduced to the desired extent.

The coils are thus energized and the axles 1 and 3 and their wheels become magnetized and effectively grip the rails.

Either one of the coils may be dispensed with in some cases and the axle 2, which is assumed to be the driving axle proper, may have a coil as well as, or instead of, either or both of the axles 1 and 3. It will be observed that the wheels are all positively coupled by connecting rods 16, and thus all of the wheels are definitely driving wheels. The rods 16 are reciprocated by the wheels of axle 2.

Instead of the battery 8 the coils may be fed from a dynamo, or from the track if the vehicle is electrically propelled.

What we claim is:—

1. Electromagnetic means for increasing the adhesion of vehicle wheels to rails of the kind wherein electromagnet coils or solenoids are arranged around the driving-wheel axles and when energized magnetize the axles and wheels, characterized in that each pair of wheels which are positively driven with its axle and magnetizing coil constitutes an individual unit under the control of an independent switch.

2. Electromagnetic means for increasing the adhesion of vehicle wheels to rails of the kind wherein electromagnet coils or solenoids are arranged around the driving-wheel axles and when energized magnetize the axles and wheels, characterized in that each pair of wheels which are positively driven with its axle and magnetizing coil constitutes an individual unit under the control of an independent switch and further characterized in that all the independent switches are in series with a common resistance.

3. Electromagnetic means for increasing the adhesion of vehicle wheels to rails, including wheel axles, coils carried by and concentric with the axles, means whereby the coils may be independently energized or deenergized with the energizing of the coils serving to magnetize the axles and wheels, and connecting means between the wheels, certain of the wheels serving as drivers.

4. Electromagnetic means for increasing the adhesion of vehicle wheels to rails, comprising a plurality of axles carrying wheels, magnetizing coils carried by and concentric with the axles, means whereby the respective coils may be energized or deenergized independently, the energization of the coils serving to magnetize the axles and wheels, additional wheels serving as drivers, and connecting rods between said additional wheels and the first mentioned wheels.

In testimony whereof we affix our signatures.

JAMES WILLIAM PETERSON.
THOMAS CAMPBELL JUNER.